United States Patent [19]
Mori et al.

[11] Patent Number: 5,599,074
[45] Date of Patent: Feb. 4, 1997

[54] VEHICLE BRAKE DEVICE HOUSING WITH PROPORTIONING, TRACTION, INLET AND OUTLET VALVES

[75] Inventors: Hisayoshi Mori; Norikata Goto; Nobushige Teraji; Takashi Fujii, all of Hamakita, Japan

[73] Assignee: Nisshinbo Industries Inc., Tokyo, Japan

[21] Appl. No.: 509,060

[22] Filed: Jul. 31, 1995

[30] Foreign Application Priority Data

Aug. 2, 1994 [JP] Japan .................................. 6-198965

[51] Int. Cl.⁶ .................................................. B60T 8/36
[52] U.S. Cl. .............................. 303/113.2; 303/113.1; 303/113.5; 303/9.62; 303/119.2
[58] Field of Search .......................... 303/113.2, 113.5, 303/9.62, 9.71, 116.4, 119.2, 113.1

[56] References Cited

U.S. PATENT DOCUMENTS

| | | | |
|---|---|---|---|
| 4,824,183 | 4/1989 | Uchida et al. ........................ | 303/113.5 |
| 4,892,363 | 1/1990 | Burgdorf ............................... | 303/116.4 |
| 4,969,697 | 11/1990 | Lindenman ............................ | 303/113.5 |
| 5,021,957 | 6/1991 | Yoshino et al. ........................ | 303/113.5 |
| 5,188,435 | 2/1993 | Willmann ............................. | 303/113.02 |
| 5,236,256 | 8/1993 | Schmidt et al. ...................... | 303/113.2 |
| 5,244,262 | 9/1993 | Kehl et al. ............................ | 303/119.2 |

Primary Examiner—Matthew C. Graham
Attorney, Agent, or Firm— Nikaido, Marmelstein, Murray & Oram LLP

[57] ABSTRACT

A vehicle brake device is provided which enables easier mounting of the proportioning valve(s), and easier assembly and better layout of the whole brake device. An auxiliary hydraulic pressure source and traction valve are positioned on the side face of a hydraulic pressure box (70), and dumping chambers (26), auxiliary reservoirs (31) and proportioning valve(s) (24) are positioned on the bottom of the hydraulic pressure box such that the axial centers are parallel, and the proportioning valve(s) (24) is (are) arranged below the axial center of the auxiliary hydraulic pressure source and below the traction valve (23), and positioned such that brake fluid therein flows from the bottom to the top.

1 Claim, 7 Drawing Sheets

AXIAL CENTER OF THE AUXILIARY HYDRAULIC PRESSURE SOURCE

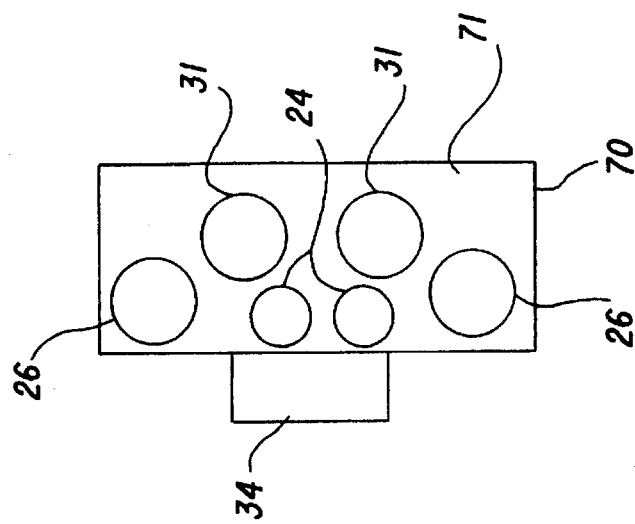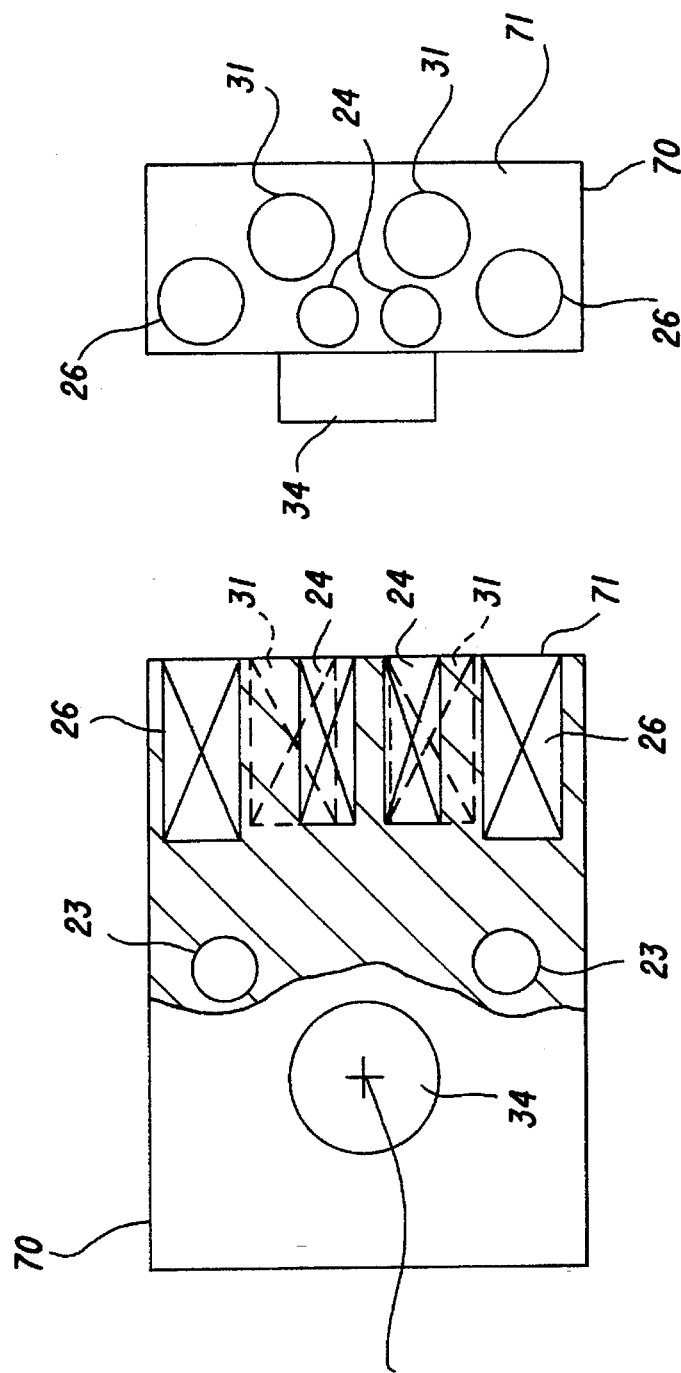
Fig.7(B)
Fig.7(A)
AXIAL CENTER OF THE AUXILIARY HYDRAULIC PRESSURE SOURCE

VEHICLE BRAKE DEVICE HOUSING WITH PROPORTIONING, TRACTION, INLET AND OUTLET VALVES

BACKGROUND OF THE INVENTION

This invention relates to a vehicle brake device equipped with a proportioning valve (P-valve).

In a conventional brake device, a proportioning (P-valve) is positioned externally to the brake pressure generating assembly. For example, in the invention as disclosed in Publication of Unexamined Patent Application Number H5(1993)-229414, the proportioning valve is positioned on the exterior of the actuator.

A conventional arrangement of the proportioning valve present the following problems:

1. Mounting of the brake device is difficult because the brake pressure generating assembly and proportioning valve are two separate units.
2. Assembly is difficult because the brake pressure generating assembly and proportioning valve are connected by tubing.
3. The layout is poor because the brake pressure generating assembly and proportioning valve must be installed in separate locations.

SUMMARY OBJECTIVES OF THE INVENTION

The objective of this invention is to improve the mountability, assembly, and layout of the proportioning valve (P-valve).

With this goal in mind, a vehicle brake device is provided which enables easier mounting of the proportioning valve, and easier assembly and better layout of the whole brake device.

An auxiliary hydraulic pressure source and traction valve are positioned on the side face of a hydraulic pressure box 70, and dumping chambers 26, auxiliary reservoirs 31 and proportioning valve 24 are positioned on the bottom of the hydraulic pressure box such that the axial centers are parallel, and the proportioning valve 24 is arranged below the axial center of the auxiliary hydraulic pressure source and below the traction valve 23, and positioned such that brake fluid therein flows from the bottom to the top.

This invention provides the following advantages:

1. The proportioning valves are housed inside a hydraulic pressure box, thereby making it easier to mount the brake device.
2. The proportioning valves are housed inside a hydraulic pressure box, thus eliminating the need to connect the valves with tubing and other components, thereby facilitating assembly of the brake device.
3. The proportioning valves are housed inside a hydraulic pressure box, thereby making more effective use of space, and enabling a better layout.
4. The proportioning valves are positioned under the axial center of the auxiliary pressure source and below the traction valve, thereby making more effective use of space.
5. Inside the proportioning valve, brake fluid flows from bottom to top, thus preventing the entrapment of air.

DETAILED DESCRIPTION OF THE DRAWINGS

The above and other objects and the attendant advantages of the present invention will become readily apparent by reference to the following detailed description when considered in conjunction with the accompanying drawings wherein:

FIG. 7 is a conceptual diagram of the hydraulic pressure box housing two proportioning valves.

DETAILED DESCRIPTION OF THE DRAWINGS AND OF THE PREFERRED EMBODIMENT

Figure 1:
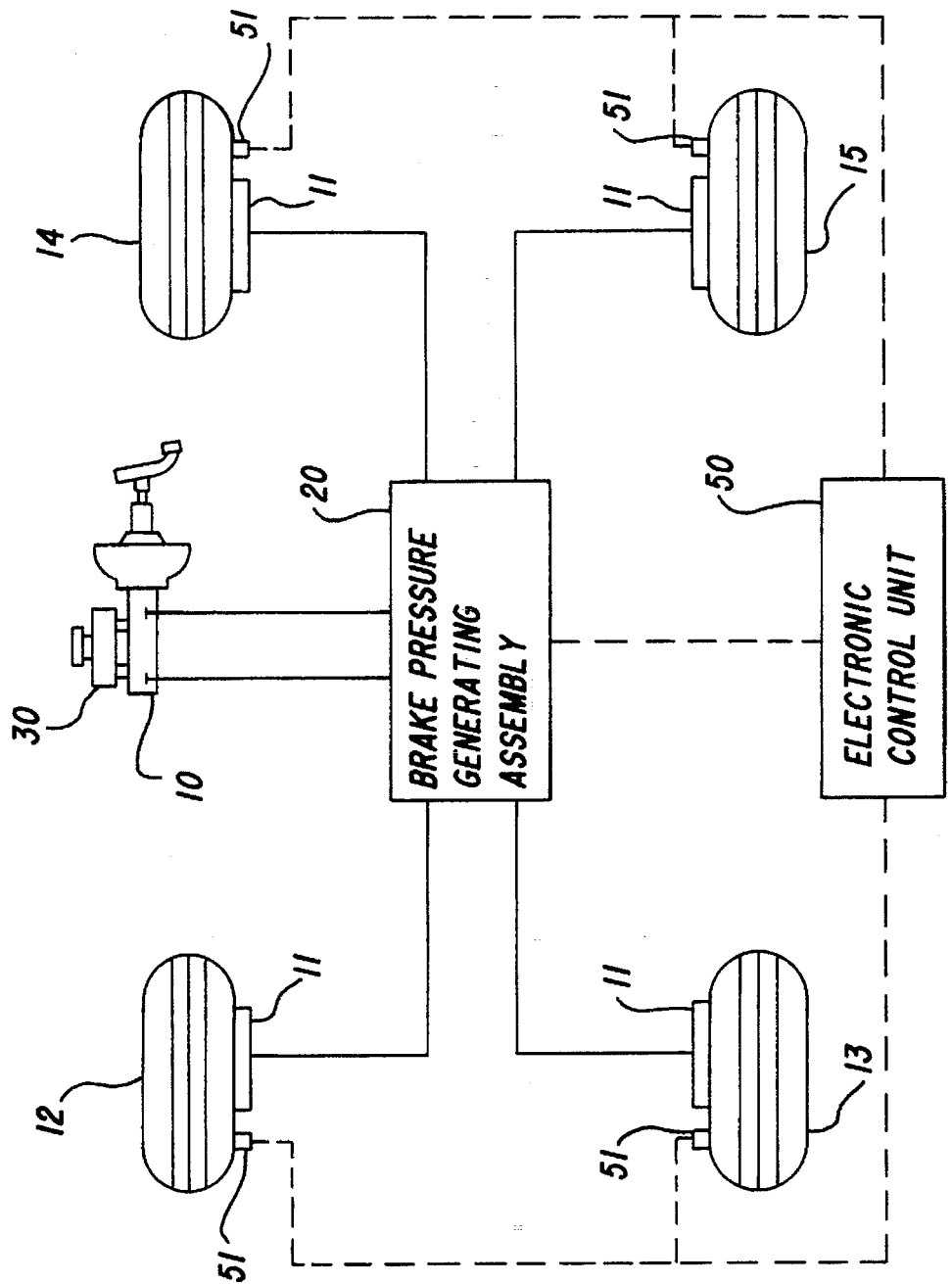
FIG. 1 is a conceptual diagram of the brake device.

Working examples of this invention are explained below with reference to the attached diagrams.

A. Overview of Vehicle Brake Device

When the brake pedal is pressed, the hydraulic pressure generated from the master cylinder 10 is applied, by means of the brake pressure generating assembly 20, to the respective wheel cylinder 11 of the wheels 12, 13, 14, 15 to brake the vehicle. If the brake pedal is pushed to hard causing the wheels 12–15 to slip, based on signals being transmitted from each wheel speed sensor 51, the electronic control unit 50 controls the skidding (ABS) to traction (TCS) of the wheels 12–15 by means of the brake pressure generating assembly 20. The electronic control unit 50 can be any customized hardware, microcomputer, or any other general computer configuration.

B. Configuration of Brake Lines

Figure 2:
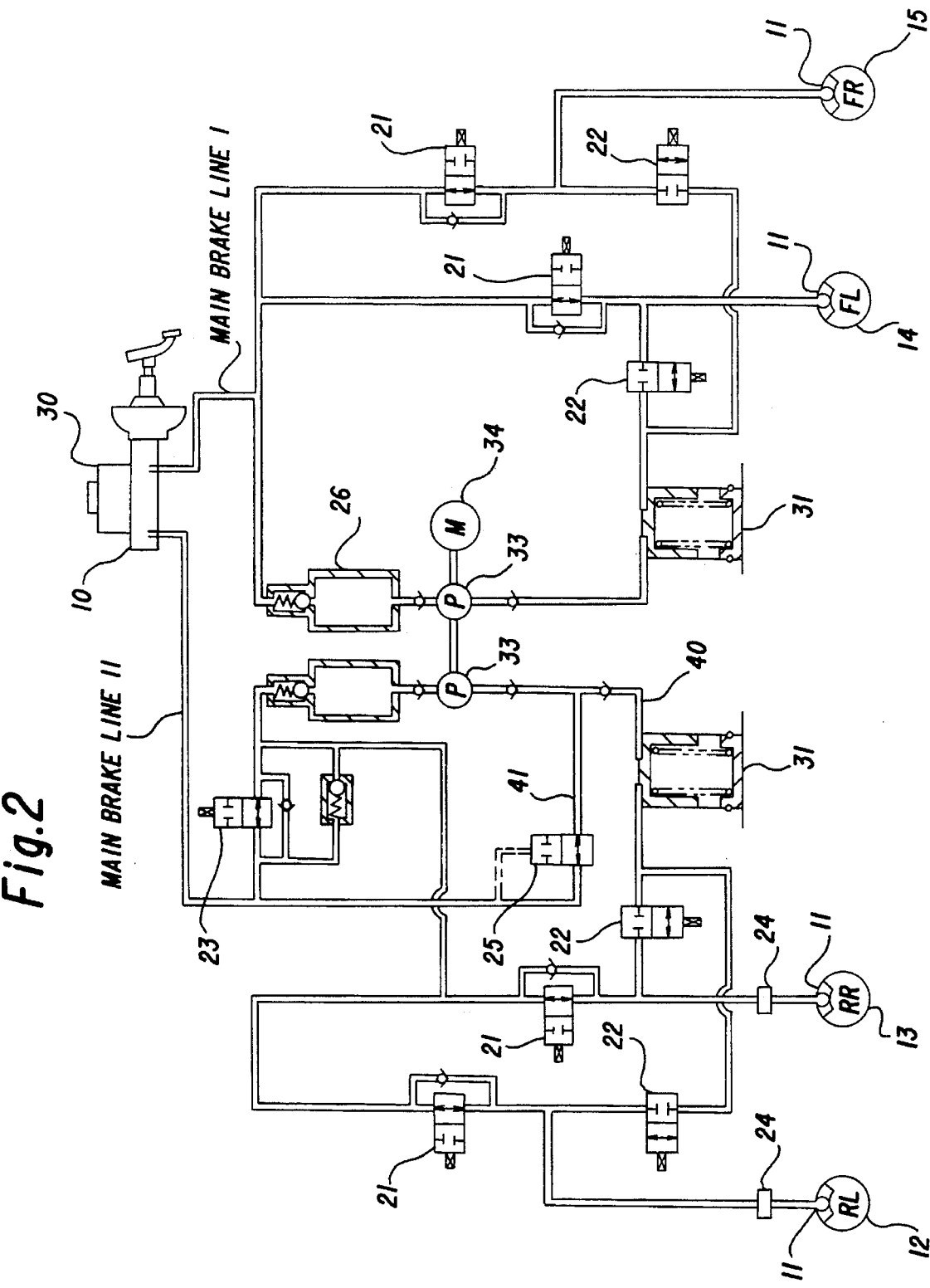
FIG. 2 is a layout diagram of the brake lines, with attached proportioning valves, in a H-configuration.
Figure 3:
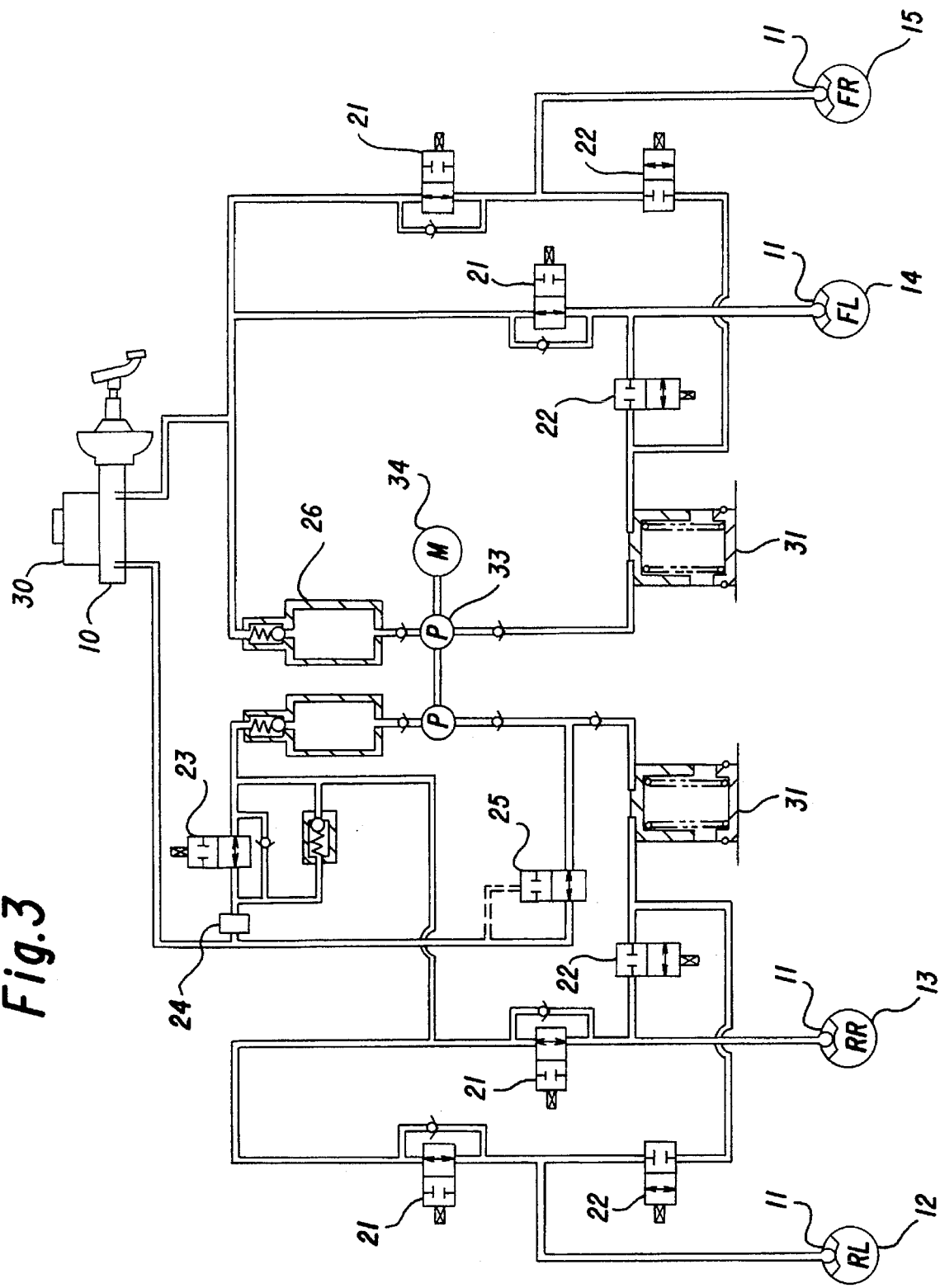
FIG. 3 is another layout diagram of the brake lines, with attached proportioning valve, in an H-configuration.

As shown in FIG. 2 and FIG. 3, the wheel cylinders 11 of the wheels 12, 13, 14, 15 are connected to the master cylinder 10 by means of two separate main brake lines I, II arranged in an "H-configuration". The main brake line I supplies brake pressure to the front wheels 14, 15, while main brake line II supplies brake pressure to the rear wheels 12, 13. An inlet valve 21 in other words, a normally open solenoid valve, is installed for each wheel 12–15 in the respective brake lines I, II.

The reflux line 40 is connected upstream of the inlet valve 21 in the respective main brake line. A normally closed outlet valve 22, auxiliary reservoir 31, and an auxiliary hydraulic pressure device and dumping chamber 26 are mounted in the reflux line. The auxiliary hydraulic pressure source is comprised of a hydraulic pump 33 and motor 34.

In the main brake line II, a traction valve 23 is mounted upstream of the point of confluence of the main reservoir 30 and reflux line 40. An auxiliary hydraulic pressure line 41, branching off the main brake line II from the main reservoir 30, and equipped with an auxiliary line valve 25 is connected to the auxiliary hydraulic pressure source. In the configuration of FIG. 2, two proportioning valves (P-valve) 24 are used; that is, one valve is connected to each of the respective wheel cylinders 11 of the left and right rear wheels 12, 13; in that of FIG. 3, one P-valve is connected to the traction valve 23.

Figure 4:
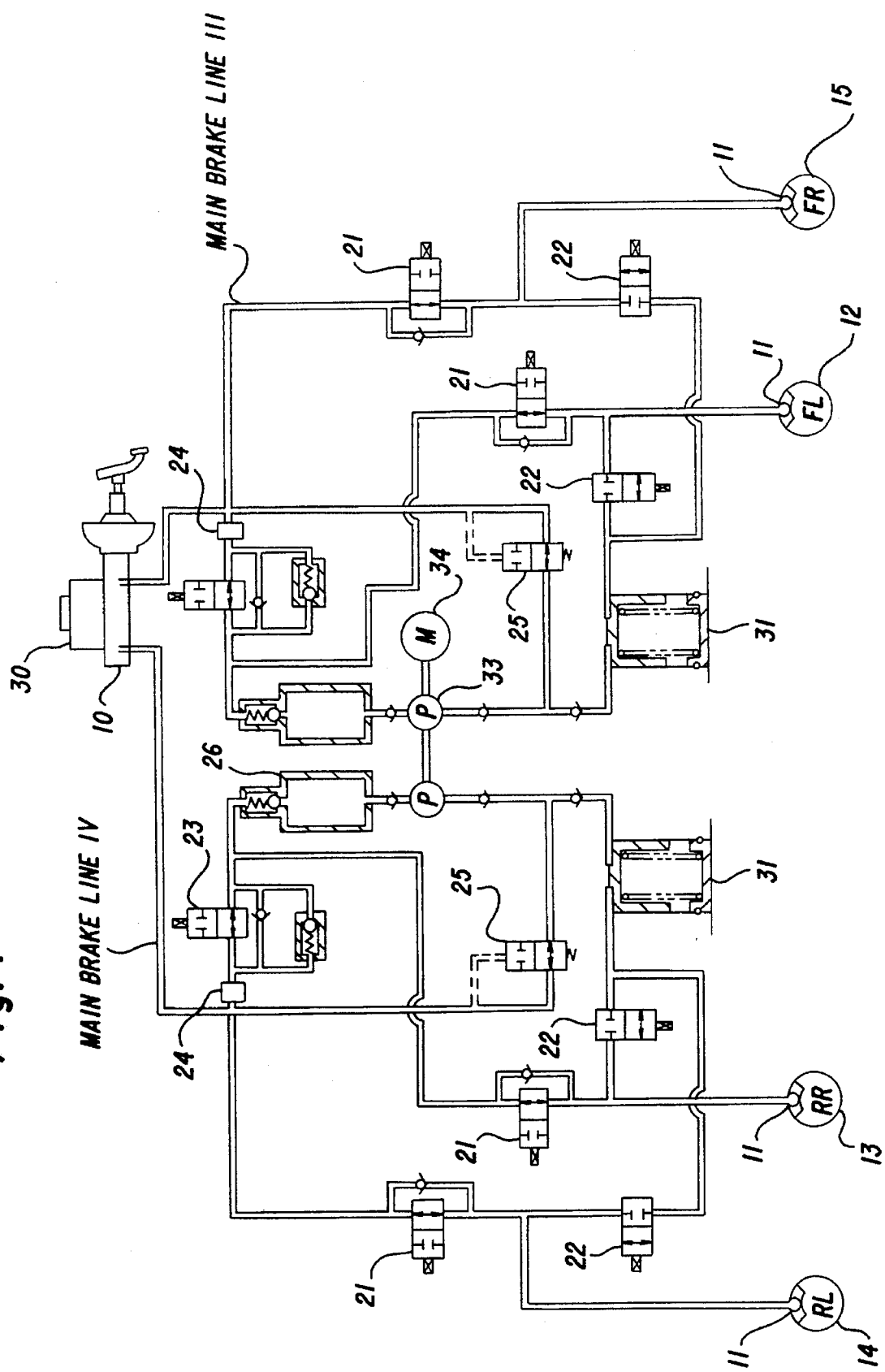
FIG. 4 is a diagram of the brake lines, with attached proportioning valves, in a X-configuration.

In FIG. 4, the main brake line III connects the wheel cylinders 11 of the left rear wheel 12 and right front wheel 15 to the master cylinder 10, and the main brake line IV connects the wheel cylinders 11 of the right rear wheel 12 and left front wheel 14 to the master cylinder 10 in a so-called "X-configuration". A proportioning valve 24 is connected upstream of each traction valve 23 in each respective line on the rear wheel 12, 13 side.

C. Configuration of Proportioning Valve

Figure 5:
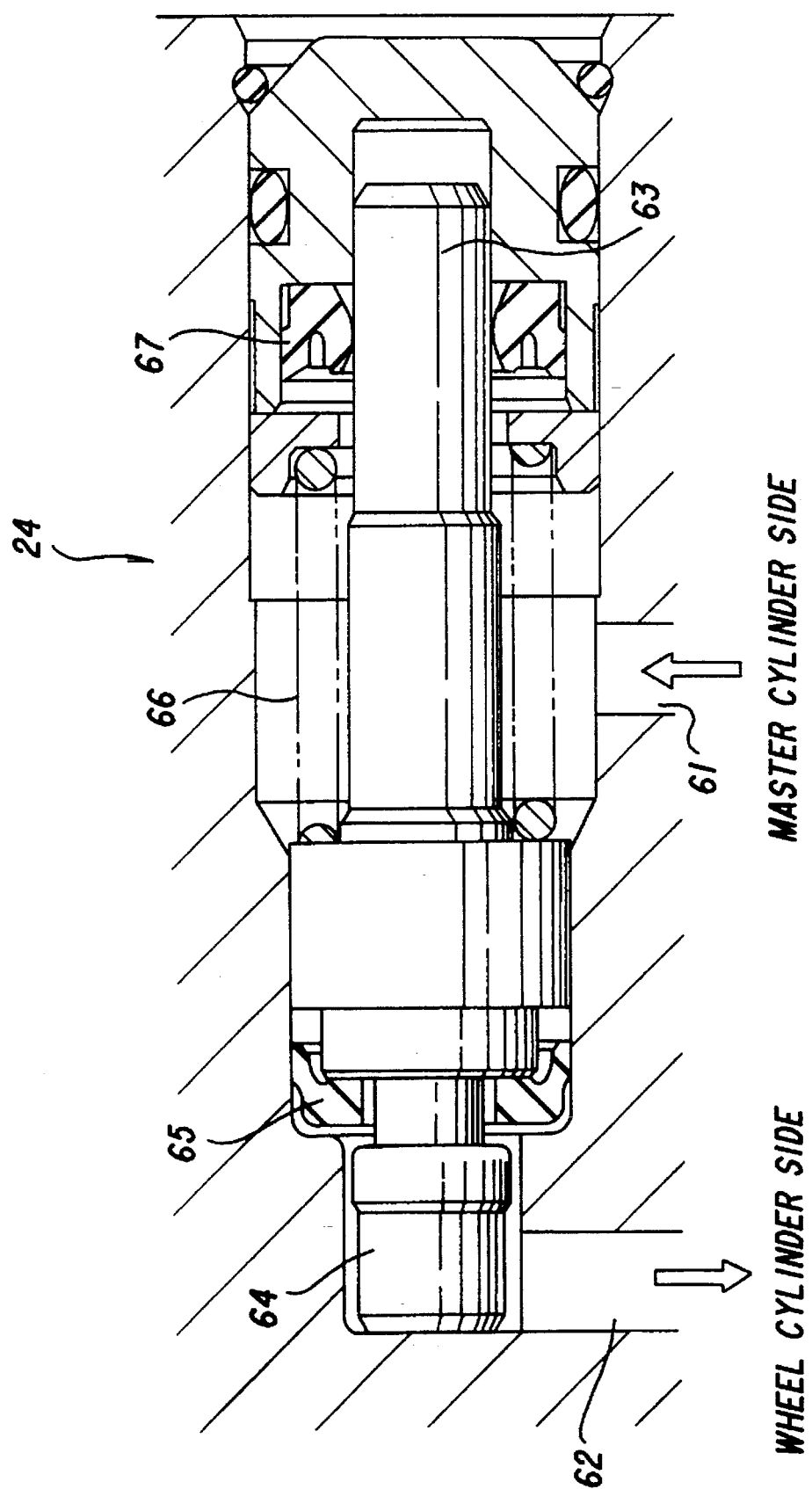
FIG. 5 illustrates the configuration of a proportioning valve.

As shown in FIG. 5, the proportioning valve 24 is configured from a brake fluid inlet 61 and brake fluid outlet 62, and an internal movable piston 63, energized by spring 66. If the input brake pressure at the inlet 61 from the master cylinder is low, the pressure passes unattenuated through the proportioning valve and is discharged from the outlet 62 on the wheel cylinder side, wherein the input pressure is equal to the output pressure.

If the input pressure rises to a certain value, where the product of the cross section area of the seal lip 67 multiplied by the input pressure exceeds the spring force, then the position 63 moves to the right (as manifested in FIG. 5). In doing so, the piston head 64 makes contact with the seal 65, and blocks the brake line. Then as the input pressure rises further, the piston 63 moves to the left, opening the brake line, wherein the increased hydraulic pressure is transferred to the outlet 62 to increase the output pressure. As the output pressure increases further, the piston 63 once again moves to the right to block the brake line. This action maintains a constant proportion between the increase in the input pressure and the increase in the output pressure, and the input pressure becomes greater than the output pressure. Thus the use of the proportioning valve lowers the pressure of the rear wheels from that of the front wheels.

D. Positioning of Proportioning Valves

Figure 6B:
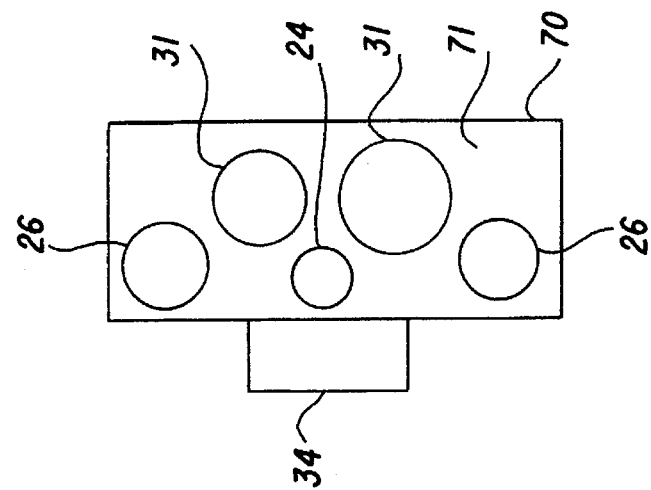
FIG. 6 is a conceptual diagram of the hydraulic pressure box housing one proportioning valve.
Figure 6A:
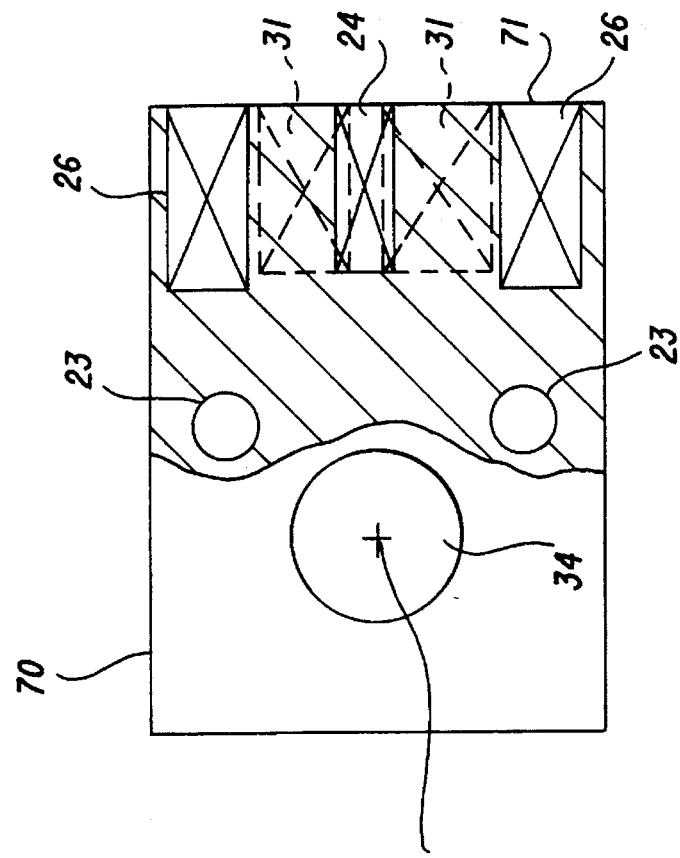

FIG. 6(A) illustrates a partial cross section of the hydraulic pressure box 70; while FIG. 6(B) illustrates the bottom face of the box. The main purpose of the hydraulic pressure box 70 is to house the devices of the brake pressure generating assembly 20; for example, a motor 34 is positioned on a side face such that the center of the motor becomes the axial center of the auxiliary hydraulic pressure source. The traction valve 23 is arranged, on the side face of the hydraulic pressure box 70, to be parallel to the axial center of the auxiliary hydraulic pressure source. A proportioning valve 24 is arranged on the bottom face 71 of the hydraulic pressure box 70, under the axial center of the auxiliary pressure source and below the traction valve 23.

The proportioning valve 24 is positioned such that brake fluid will flow from the bottom to the top which will prevent air from accumulating. Also on the bottom face 71, a dumping chamber 26 is set at each end and an auxiliary reservoir 31 is set between each dumping chamber 26 and the central P-valve. The proportioning valve 24, dumping chamber 26, and auxiliary reservoirs 31 are arranged such that their axial centers are parallel.

FIG. 7 illustrates an embodiment in which the hydraulic pressure box 70 as configured in FIG. 6, houses two proportioning valves 24 instead of one. Here, a dumping chamber 26 is set at each end, two proportioning valves 24 are positioned in the center, and an auxiliary reservoir 31 is set between each dumping chamber and each P-valve on the inner bottom face 71. These devices are arranged such that their axial centers are parallel.

It is readily apparent that the above described has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

We claim:

1. A vehicle brake device comprising:
   an inlet valve installed in a main brake line connecting a master cylinder to a wheel cylinder of each front wheel;
   a proportioning valve, traction valve and inlet valve installed in the main brake line connecting the master cylinder to a wheel cylinder of each rear wheel; and
   an outlet valve, auxiliary reservoir, auxiliary hydraulic pressure source, and dumping chamber mounted in a reflux line connecting the wheel cylinder to the main brake line;
   wherein the auxiliary hydraulic pressure source and the traction valve are positioned on a side face of an hydraulic pressure box, and the dumping chambers, the auxiliary reservoirs and the proportioning valve are positioned on a bottom face of the hydraulic pressure box such that their axial centers are parallel, and the proportioning valve is arranged below the axial center of the auxiliary hydraulic pressure source and the traction valve, and positioned such that brake fluid therein is capable of flowing from bottom to top when air is exhausted during the brake fluid introduction.

* * * * *